United States Patent

Hoell

[15] 3,699,267

[45] Oct. 17, 1972

[54] APPARATUS FOR COPYING MAGNETIC TAPES

[72] Inventor: Paul C. Hoell, West Chester, Pa.

[73] Assignee: E. I. du Pont de Nemours and Company, Wilmington, Del.

[22] Filed: March 18, 1970

[21] Appl. No.: 20,719

[52] U.S. Cl. ....................... 179/100.2 E, 346/74 MT

[51] Int. Cl. ............................ G11b 5/86, H01v 3/04

[58] Field of Search ................ 179/100.2 D, 100.2 E; 346/74 MT

[56] References Cited

UNITED STATES PATENTS

| | | | |
|---|---|---|---|
| 3,541,577 | 11/1970 | Lemke | 346/74 MT |
| 2,768,049 | 10/1956 | Geiser | 179/100.2 E |
| 2,594,934 | 4/1952 | Kornei | 179/100.2 D |
| 2,747,026 | 5/1956 | Camras | 179/100.2 E |

*Primary Examiner*—J. Russell Goudeau
*Attorney*—D. R. J. Boyd

[57] ABSTRACT

A thermoremanent copying apparatus for copying signals recorded on magnetic tape in which the face of the copy tape having a layer of magnetic material is heated above the Curie temperature by contact with a metal block immediately prior to contacting a master tape in the nip of two rolls.

2 Claims, 5 Drawing Figures

INVENTOR
PAUL C. HOELL

BY DRBoyd

ATTORNEY

INVENTOR
PAUL C. HOELL

BY

ATTORNEY

APPARATUS FOR COPYING MAGNETIC TAPES

FIELD OF THE INVENTION

This invention relates to apparatus for the thermoremanent copying of signals recorded on a master tape to a copy tape.

BACKGROUND OF THE INVENTION

The conventional method of manufacturing copies from a master tape is to pass the tape over a pickup head and after suitable amplification to record the electronic signal on a copy tape. This method has the disadvantage that any fluctuation in the drive speed of the master tape with respect to the speed of the copy tape introduces distortion. Anhysteretic contact printing has also been suggested in which the master tape and the copy are placed in face to face contact and exposed to a decaying a.c. magnetic field (Herr et al. U.S. Pat. No. 2,738,383). In general this method has the disadvantage that the copied signal is generally weaker than that of the master. Further, it is necessary to employ a master tape having a working magnetic layer of higher coercivity than the magnetic layer of the copy tape.

It has also been proposed to employ thermoremanent transfer for contact copying, cf., Greiner U.S. Pat. No. 3,364,496; Daly et al. Belgian Pat. No. 690,598. In this technique the copy tape is heated above the Curie temperature of its working magnetic material and cooled to a temperature below the Curie temperature in the magnetic field generated by the signals recorded on the master tape. The advent of high efficiency magnetic tapes using chromium dioxides as the magnetic layer makes this method attractive in view of the relatively low Curie temperature of chromium dioxide. Thermoremanent copying of magnetic signals has the advantage that the copied magnetic recording may have an intensity of magnetization as great as or even greater than that of the original. Moreover, magnetization acquired by thermoremanent methods is less readily erased than that obtained by anhysteretic magnetization. A disadvantage of thermoremanent techniques is that heat is employed which can physically distort the magnetic tape employed. Thus despite their obvious advantages, thermoremanent techniques have not been widely employed in industry.

SUMMARY OF THE INVENTION

The apparatus of this invention is intended for use in copying magnetic signals recorded on a magnetic tape onto a copy magnetic tape.

The master tape is drawn over a roll and through a nip formed by contact with this roll and a second roll so that the coating of the magnetic tape faces the second roll. At least one of the two rolls should have a resilient face. A copy magnetic tape is also passed through the nip with its magnetic coating facing the magnetic coating of the master tape. The magnetic coating of the copy tape is heated by sliding contact with the surface of a heating block in fixed position relative to the rolls and extending to a position in close proximity to the nip, the heating block being spaced from the surface of the master tape. Heat is supplied to the heating block to heat the magnetic coating of the copy tape to a temperature sufficiently above the Curie temperature so that the temperature of the coating remains above the Curie temperature until the copy tape contacts the master tape, but falls below the Curie temperature while the copy tape is in the nip of the rolls. A movable roll is provided which cooperates with the nip of the pair of rolls to urge the coated surface of the copy tape into contact with the heating block while the copy tape is being drawn through the nip of the rolls by the movement of the master tape.

THE DRAWINGS AND DETAILED DESCRIPTION OF THE INVENTION

This invention will be better understood by reference to the accompanying drawings. In these drawings, throughout which the same number is used to indicate the same part;

Figure 1:
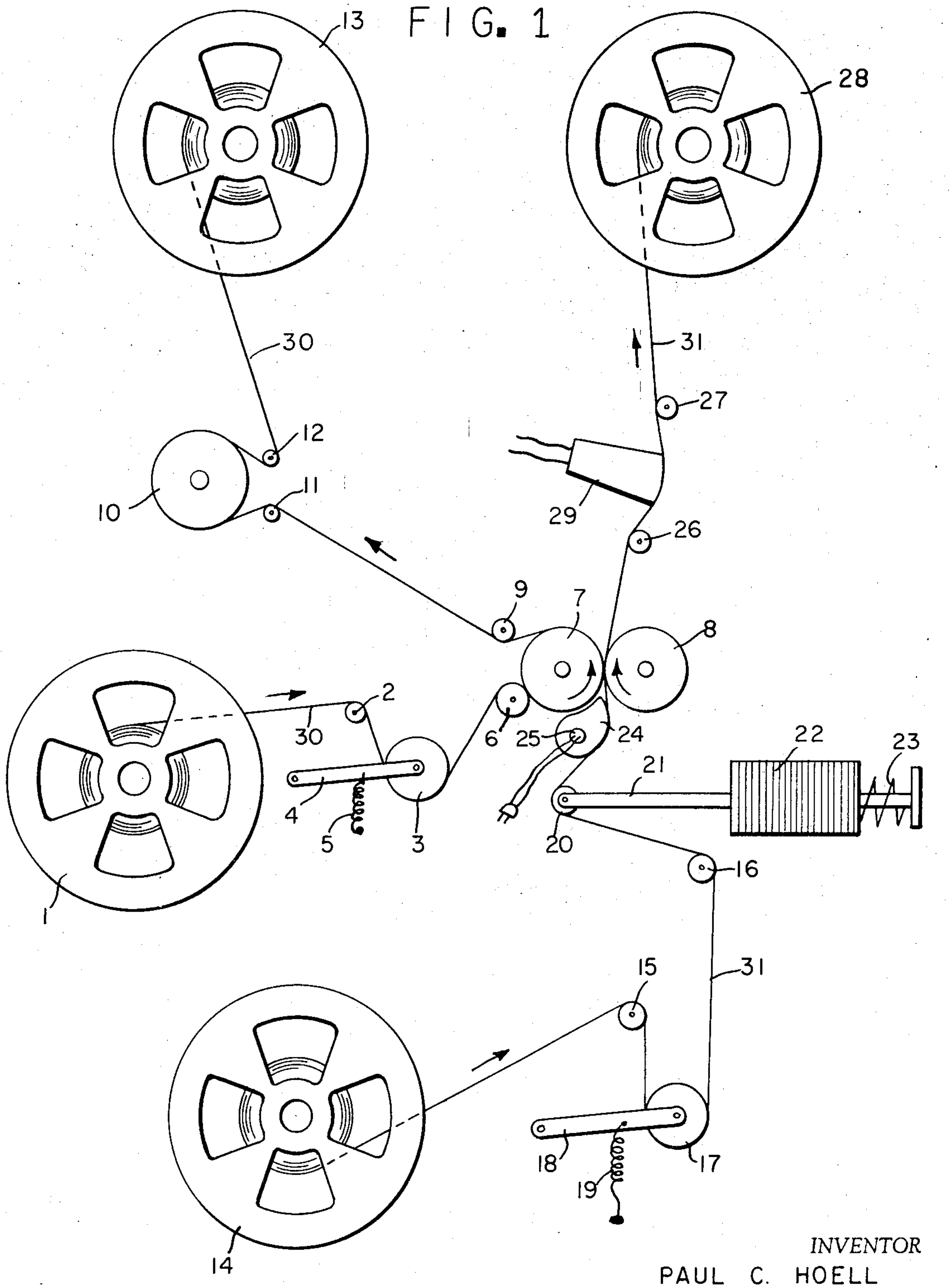
FIG. 1 is a plan view of apparatus embodying the present invention.

In FIG. 1 the master tape 30 on which are recorded magnetic signals is stored on a conventional tape reel 1 rotatably mounted on a suitable base preferably with a small, constant torque motor and magnetic braking means such as are employed in conventional tape recorders. Tape from roll 1 passes over an idler roll 2, a floating roll 3 which can move on a pivoted lever 4 loaded with a spring 5 to take up any slack in the system. After passing over roll 3 the master tape passes over a guide roll 6 having a shallow groove in its face adapted to fix the lateral position of the tape. The tape then passes around roll 7 through a nip formed between roll 7 and a second roll 8. At least one of rolls 7 and 8 should have a resilient surface. After passing over roll 7 the tape passes over a second guide roll 9 to further assist the lateral guidance of the tape, to a tape capstan roll 10, which can be driven at a substantially constant speed. Contact with a major portion of the periphery of capstan 10 is maintained by idler rolls 11 and 12. The master tape is taken up on a reel 13 which is rotatably mounted with a constant torque motor and a magnetic brake following conventional tape recording practice. The master tape is positioned so that the magnetic coating on which the information is recorded as a sequence of magnetic signals is facing roll 8, i.e., the back or tape substrate is in contact with roll 7.

A copy tape 31 is supplied by reel 14 which is rotatably mounted and driven as for reel 1. Idler rolls 15 and 16 operating in conjunction with a floating roll 17 rotatably mounted on a pivotable arm 18 loaded with a spring 19 are provided to maintain substantially constant tension in the system. The copy tape then passes over a movable roll 20 mounted on an arm 21 so that the roll 20 can be moved along the line of the arm 21. The movement can be controlled by hand, but preferably electromagnetic or other mechanical means are employed to position the arm as desired in response to control signals. In the drawing the arm (which should be of a non-magnetic material) is attached to the soft iron core of a solenoid 22 so that current passing through the solenoid urges the arm forward against the body of a light spring 23. The copy tape then passes over one surface of a heating block 24 to the nip of rolls 7 and 8 when the magnetic coating of the copy tape is urged into intimate mechanical and thermal contact with the magnetic coating of the master tape. The rolls 7 and 8 are driven by the movement of the master tape which also serves as a drive for the copy tape and roll 8. The heating block 24 is provided with an electrical cartridge heater 25 which is operated by a variable power supply (not shown). A thermocouple (not shown in this figure) is also provided to monitor the temperature of the heating block 24. The heating block 24 is mounted on the base in fixed spatial relationship to the rolls 7 and 8 and thermally insulated from the base.

After passing through the nip of rolls 7 and 8 the copy tape passes over idler rolls 26 and 27 and is taken up by reel 28 rotatably mounted with a constant torque motor and magnetic brake as for roll 13. A conventional electromagnetic head 29 can be provided to monitor the signal transferred to the copy tape, any signal picked up by the head being amplified and displayed on an oscilloscope or other suitable monitoring equipment depending on the type of signal being copied.

Figures 2, 3, 5:
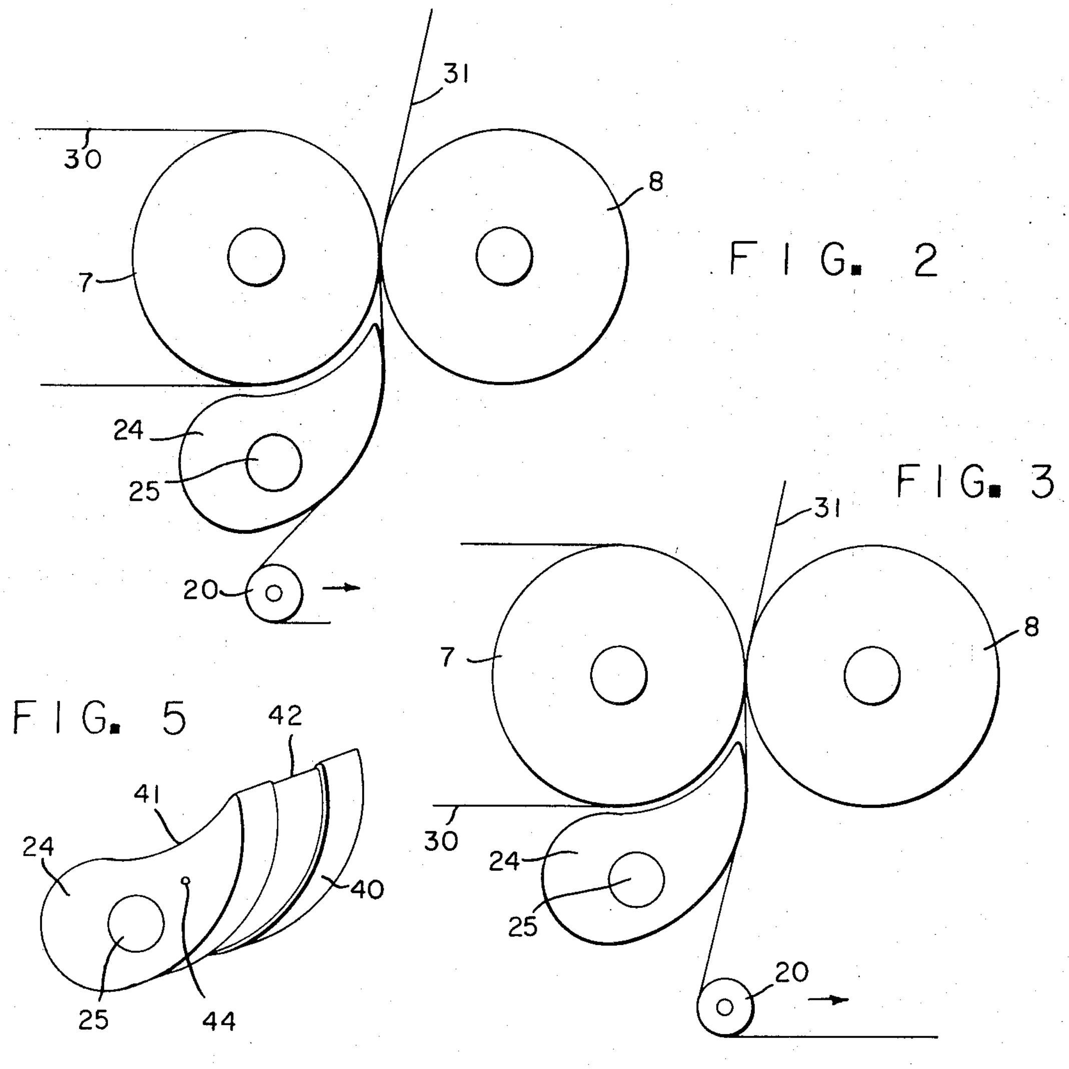
FIG. 2 is a drawing to illustrate a suitable heating block and showing the contact of the copy tape with the heating block in one position of the movable roll.
FIG. 3 is similar to FIG. 2 except that the movable roll has been positioned to provide a lower degree of contact with the heating block.
FIG. 5 is a sketch in isometric projection of one form of a heating block provided with means to guide the copy tape laterally to ensure accurate registration with the master tape.
Figure 4:
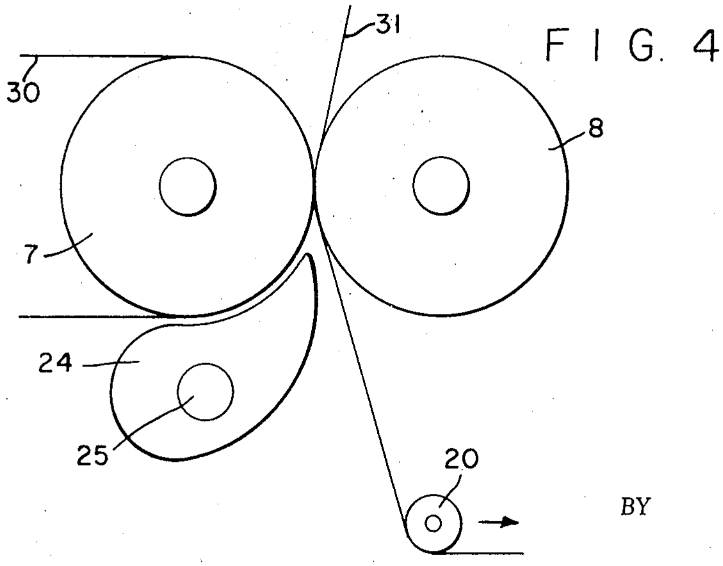
FIG. 4 is similar to FIGS. 2 and 3 except the movable roll has been positioned to avoid contact of the copy tape with the heating block.

FIGS. 2, 3 and 4 illustrate the passage of the heating tape over the heating block as determined by the nip of rolls 7 and 8 and the variable roll 20. By means of roll 20 the area of the convex surface (see FIG. 5, 40) of heating block 24 in contact with the magnetic coating of the copy tape 31 can be varied as shown in FIGS. 2 and 3. In FIG. 4 the roll 20 is withdrawn to the maximum extent and the copy tape no longer contacts the heated surface of the heating block 24. It is desirable to provide such a control to permit more rapid change in the heating of the magnetic tape coating than can be achieved by changing the heat input to the block, and also provide means to disengage the magnetic copy tape from the block when the tape is not in movement.

FIG. 5 is a sketch, in isometric projection, of the heating block 24 to show a preferred construction in greater detail. The block can be constructed of any heat conducting non-magnetic metal such as copper and preferably plated with rhodium or other light reflecting non-corrosive metal to prevent corrosion, to present a hard contacting surface, and to minimize loss of heat by radiation (and consequent undesired heating of adjacent elements of the apparatus). The face 40 of block 24 over which the tape passes is preferably convex perpendicular to the direction of travel of the tape, which shape, together with the movement of roll 20 provides control over the area of surface contacted by the block. The face 40 of the heating block can optionally be provided with a shallow groove 42 substantially the width of the tape which serves to restrain the lateral movement of the tape and provide accurate registration with the master tape. The face 41 of the heating block opposite face 40 is preferably concave in a direction perpendicular to the line of tape travel and preferably conforms to the shape of roll 7 but is spaced therefrom. Such a configuration provides the maximum amount of volume for the heating block in the limited space available in close proximity to the nip of rolls 7 and 8. The heating block is provided with a hole in which is fitted a small cartridge electrical heater 25, and a well for a thermocouple, 44, which is employed to monitor the temperature of the block.

Since the copying process employed with the apparatus of this invention requires heating the magnetic material of the copy tape to a temperature above the Curie temperature, it is desirable that the magnetic tape should have as the working magnetic material a hard, particulate magnetic material with a relatively low Curie temperature, but otherwise suitable for magnetic recording. Copy tapes using finely particulate chromium dioxide are preferred for this purpose. The method of preparing chromium dioxide and modified chromium dioxides and their use in making magnetic recording tapes is described in U. S. Pat. Nos.: 2,956,955; 3,117,093; 3,074,778; 3,078,147; 2,923,683; 2,923,684; 3,034,988; 3,068,176; 2,923,685 and 3,278,263.

Such chromium dioxides have a Curie temperature in the range of 70° to 170°C., which is convenient for thermoremanent copying, yet have outstanding magnetic properties.

The copy tape may be unrecorded prior to use, but tape which has been previously recorded can be employed without prior erasure since the step of heating the tape above the Curie temperature prior to exposure to the master tape completely erases all prior information.

The master tape can be the same as, or different from, the copy tape. The upper limit of Curie temperature is unimportant. It is desirable however that the Curie temperatures of the master tape should not be substantially below that of the copy tape in order to avoid erasure on exposure to the heated copy tape.

In use the master tape is driven through the apparatus by operation of the capstan 10 of FIG. 1. Unlike conventional recording, maintenance of exact speed is not critical and a relatively crude capstan drive can be employed without sacrifice of copy quality. The copy tape is drawn through the nip of rolls 7 and 8 after being drawn over the surface of the heating block. The heat input is adjusted relative to the tape speed to heat the surface of the magnetic coating of the copy tape substantially above the Curie temperature by the sliding contact with block 24. The distance of travel over block 24, together with the short distance traveled from the end of the heating block to the nip of rolls 7 and 8 serves to equilibriate the temperature of the magnetic coating to a temperature above the Curie temperature at the point where the copy tape contacts the master tape. In the nip of the rolls 7 and 8 the copy tape contacts the master tape and is held in fixed relationship thereto and in the magnetic field of any signals recorded on the master tape, while the magnetic coating of the copy tape is cooled in the nip of the rolls to a temperature below the Curie temperature. It is believed that the rapid cooling in the nip of the rolls results in large measure from the thermal conduction of heat from the coating of the copy tape to the coating of the master tape. Signals recorded on the master tape are thus faithfully copied onto the copy tape.

The apparatus of the present invention can provide excellent copying of weak magnetic signals recorded at a linear wavelength at least as small as 75 microinches on the tape. As typical of the conditions for such transfer, a tape speed of 15 ips can be employed with a chromium dioxide master tape and an identical chromium dioxide copy tape (Tc 120°C.). Under these conditions with a dwell time of about 20 milliseconds after heating, and a residence in the nip of about 2.0 milliseconds, a heater block temperature of from 170° to 190°C. provided acceptable transfer of signals of 200 KH2 recorded at 15 ips with a 60 microinch head gap at the recording head. The signals on the copy tape thus transferred were about equal in strength to the signals on the master tape.

Since obvious modifications and equivalents in the invention will be evident to those skilled in the art, I propose to be bound solely by the appended claims.

The embodiments of this invention is which an exclusive property or privilege is claimed are defined as follows.

1. Apparatus for copying magnetic signals recorded on a master magnetic tape to a copy magnetic tape comprising a first roll;

a second roll, at least one of said first and said second rolls having a resilient surface; said second roll being in rolling contact with said first roll whereby a nip is formed between said first and said second rolls;

means to draw a master tape over said first roll and through said nip so that said master tape has its magnetic coating facing said second roll;

means to pass a copy magnetic tape through said nip disposed so that the magnetic coating of said copy tape is in contact with and in stationary relationship to the magnetic coating of said master tape in said nip;

a stationary heating block having a concave surface generally conforming to a portion of the surface of said first roll and a surface convex perpendicular to the direction of travel of said copy tape opposite said concave surface, arranged so that said concave surface is in spaced relationship from master tape passing over said first roll and said convex surface intersects said concave surface adjacent the said nip;

movable roll means adapted and arranged to urge the magnetic coating of the copy tape, in cooperation with said nip, into sliding contact with said heating block, prior to entry into the said nip, whereby the area of said convex surface in contact with said tape can be varied by movement of said movable roll means; and means to supply heat to said heating block in an mount sufficient to heat the magnetic coating of said copy tape to a temperature sufficiently above the Curie temperature so that the temperature of the magnetic coating remains above the Curie temperature until it contacts the master tape but falls below the Curie temperature while the copy tape is in the said nip.

2. Apparatus of claim 1 in which said heating block additionally has guide means to guide said copy tape laterally in lateral registration with said master tape.

* * * * *